(12) United States Patent
Mine (10) Patent No.: US 6,940,547 B1
(45) Date of Patent: Sep. 6, 2005

(54) NOISE REDUCTION CIRCUIT FOR CCD OUTPUT SIGNAL

(75) Inventor: Tadami Mine, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1168 days.

(21) Appl. No.: 09/635,660

(22) Filed: Aug. 10, 2000

(30) Foreign Application Priority Data

Aug. 18, 1999 (JP) .................................. 11-231420

(51) Int. Cl.$^7$ ........................................... H04N 5/217
(52) U.S. Cl. ........................ 348/241; 348/311; 348/607
(58) Field of Search ....................... 348/241, 311, 250, 348/607, 618, 622, 623, 625, 627

(56) References Cited

U.S. PATENT DOCUMENTS 5,715,000 A * 2/1998 Inamori ...................... 348/241

FOREIGN PATENT DOCUMENTS

JP 04-159880 * 6/1992 .......... H04N 5/335

* cited by examiner

Primary Examiner—Tuan Ho
Assistant Examiner—Heather R. Long
(74) Attorney, Agent, or Firm—Wenderoth, Lind & Ponack, L.L.P.

(57) ABSTRACT

A noise reduction circuit with high noise reduction effect and low power consumption for a high resolution charge coupled device (CCD) as well as for a usual resolution CCD is provided. A delay circuit delays an CCD output signal, and a pulse generator outputs a pulse signal having the same period that the CCD output signal has. A part of period during which the pulse signal is at a high level overlaps with a signal-level period oh the CCD output signal. A first non-additive mixing (NAM) circuit selects and output a lower level signal between the CCD output signal and the pulse signal. A second NAM circuit selects and outputs a lower level signal between the output signal from the delay circuit and the pulse signal. A difference circuit calculates difference between an output signal of the first NAM circuit and an output signal of the second NAM circuit. A delay time of the delay circuit is set so that a feedthrough-level period of an output signal of the delay circuit overlaps with a signal-level period of the CCD output signal.

12 Claims, 11 Drawing Sheets

NOISE REDUCTION CIRCUIT FOR CCD OUTPUT SIGNAL

FIELD OF THE INVENTION

The present invention relates to a noise reduction circuit, and more particularly, a noise reduction circuit to reduce noise in an output of a charge coupled device (CCD).

BACKGROUND OF THE INVENTION

A charge coupled device (CCD) is usually used as an image-picking device, and has an advantage over an image pickup tube. The advantage is compact, lightweight, low power consumption, and highly reliable. CCD has further advantages of no distortion and no sticking. Therefore, CCD is used for consumer camcorders at a first stage. In recent years, CCD is in general used for various kinds of cameras up to broadcast cameras to which a high visual quality is required.

In fact, when the resolution of a camera is getting higher, problems like a decrease in sensitivity and a decrease in a dynamic range are coming up because an amount of a signal charge of CCD decreases. For solving such problems and getting high quality images with high resolution, noise reduction is absolutely required. Dominant noises generated in CCD are a reset noise which has a correlation with a noise content in a feedthrough-level period and a signal-level period, and a 1/f noise whose level is in inverse proportion to a frequency. The feedthrough-level period and the signal-level period appear in the output of CCD repeatedly.

Various noise reduction methods have been proposed to reduce these noises. One of these is a delay and differential noise suppression method which is described in Japanese Patent Number H5-9987. A gate circuit used in this method has a little lower frequency noise, which is bounced from higher frequency noise. Therefore, this method is highly effective to reduce noise. Japanese Patent Publication Number H4-159880 describes another method for noise reduction, in which non-additive mixing (NAM) circuit is used.

Figure 8:
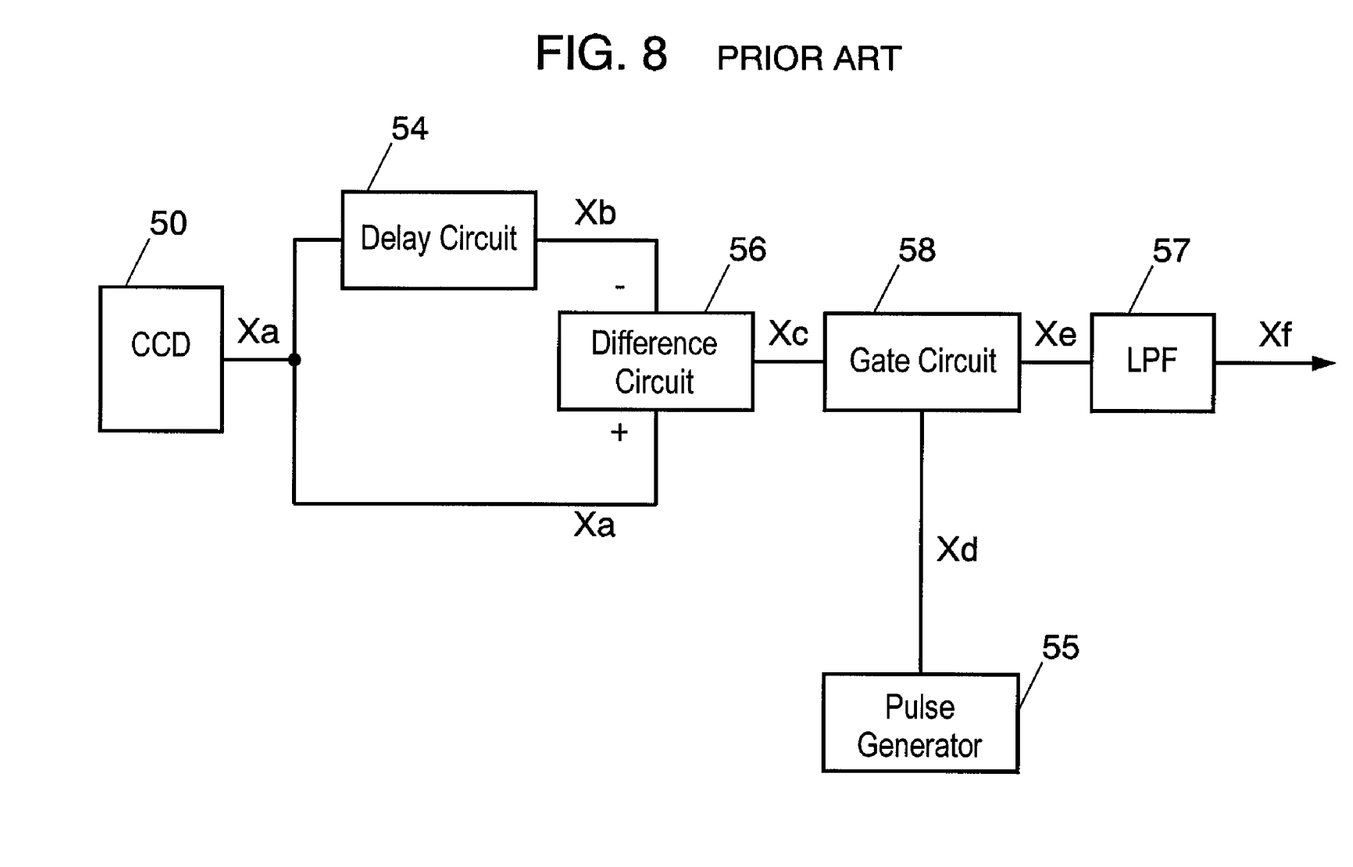
FIG. 8 is a block diagram illustrating a conventional noise reduction circuit employing a delay and differential noise suppression method.

FIG. 8 is a block diagram illustrating a noise reduction circuit employed in a delay and differential noise suppression method of the prior art. The noise reduction circuit is configured as follows. An output terminal of CCD 50 is connected to a non-inverting input terminal (+) of difference circuit 56 and an input terminal of delay circuit 54. An output terminal of delay circuit 54 is connected to an inverting input terminal (−) of difference circuit 56. An output terminal of difference circuit 56 is connected to an input terminal of gate circuit 58, and an output terminal of pulse generator 55 is connected to a control input terminal of gate circuit 58. An output terminal of gate circuit 58 is connected to an input terminal of low pass filter (LPF) 57.

Figure 9:
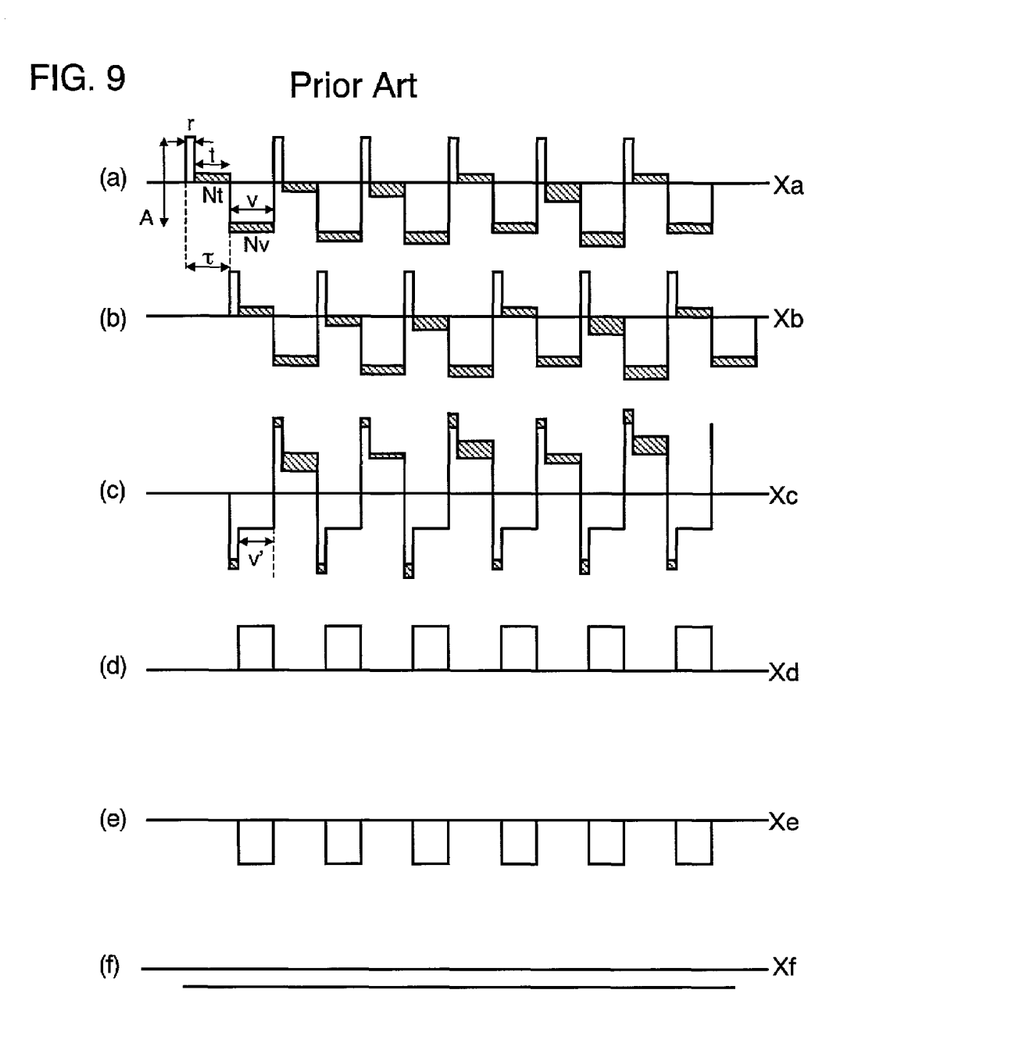
FIG. 9 is a time chart illustrating the operation in the conventional noise reduction circuit employing the delay and differential noise suppression method.

FIG. 9 is a timing chart illustrating an operation of the noise reduction circuit of FIG. 8, namely, waveforms of signals Xa through Xf in FIG. 8.

FIG. 9(a) illustrates a waveform of CCD output signal Xa from CCD 50. In CCD output signal Xa, reset-level period r, feedthrough-level period t, and signal-level period v appear in this order repeatedly. In CCD output signal Xa, a noise Nt in feedthrough-level period t has a correlation with a noise Nv in signal-level period v.

Delay circuit 54 receives CCD output signal Xa from CCD 50, delays signal Xa by specified delay time τ, and outputs delay signal Xb shown in FIG. 9(b) to difference circuit 56. Delay time τ is set so that signal-level time V of CCD output signal Xa overlaps with feedthrough-level period t of delay signal Xb.

CCD output signal Xa of CCD 50 is input to the non-inverting input terminal (+) of difference circuit 56, and delay signal Xb from delay circuit 54 is input to the inverting input terminal (−) of difference circuit 56. Difference circuit 56 calculates a difference (Xa−Xb) between the both input signals, and outputs difference signal Xc of the calculation result shown in FIG. 9(c).

In difference signal Xc, During period v' which is a part of signal-level period v of CCD output signal Xa shown in FIG. 9(a), noise Nv in signal-level period v and noise Nt in feedthrough-level period t, as they correlate each other, cancel each other and are eliminated.

FIG. 9(d) illustrates a waveform of pulse signal Xd which is output from pulse generator 55 to gate circuit 58. Pulse signal Xd having the same period that CCD output signal Xa has is at a high level only during period v' in difference signal Xc.

FIG. 9(e) illustrates a waveform of output signal Xe of gate circuit 58. When pulse signal Xd is at high level during period v' and gate circuit 58 is opened, difference signal Xc is output during period v'. During period v', difference signal Xc does not have a noise, therefore, output signal Xe of gate circuit 58 does not have a noise.

LPF 57 receives output signal Xe of gate circuit 58, rejects useless high frequencies, makes the signal smoothed, and outputs final output signal Xf shown in FIG. 9(f).

Figure 10:
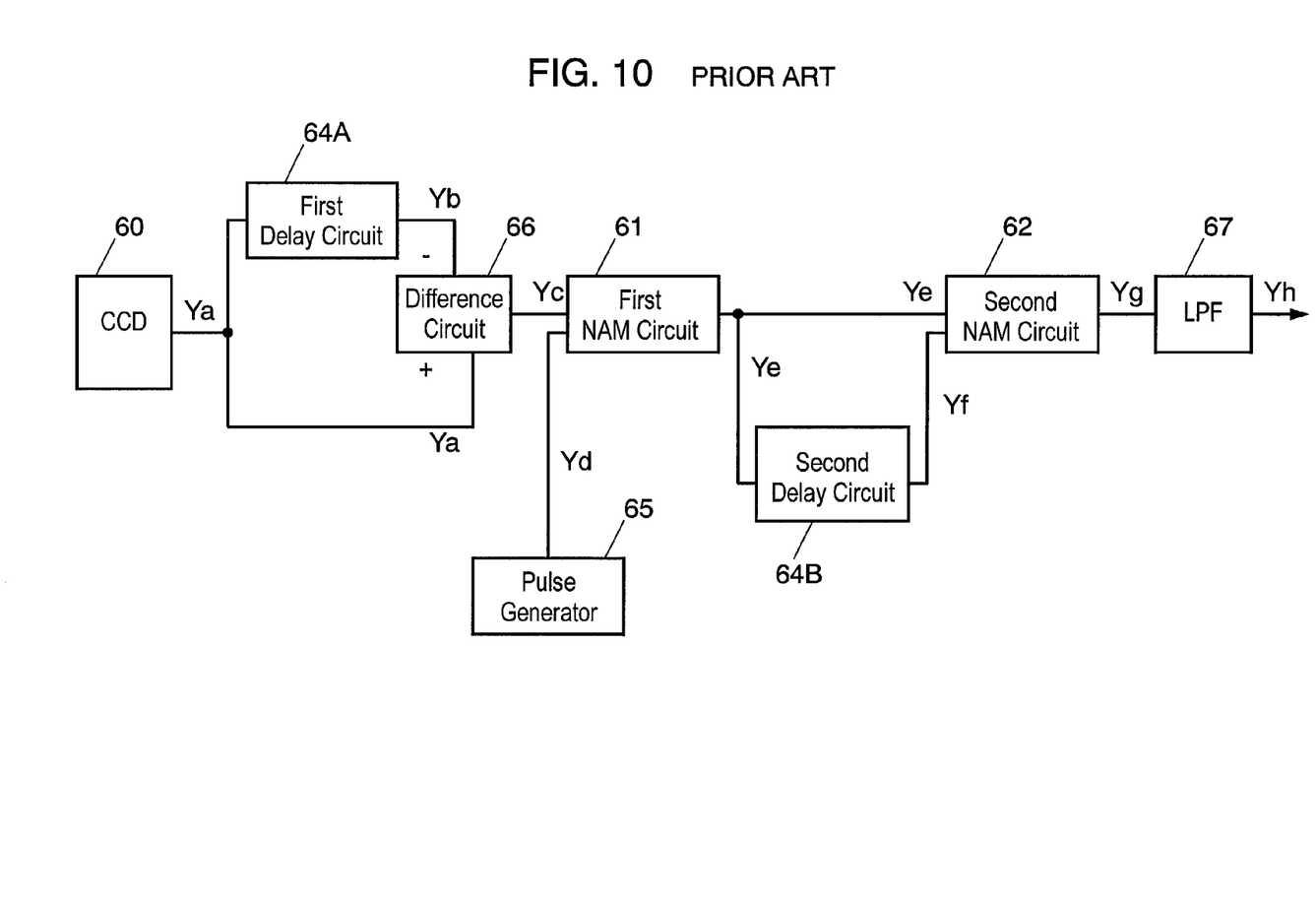
FIG. 10 is a block diagram illustrating a conventional noise reduction circuit employing a NAM circuit.

FIG. 10 is a block diagram illustrating a noise reduction circuit in which non-additive mixing (NAM) circuit is employed. An output terminal of CCD 60 is connected to a non-inverting input terminal (+) of difference circuit 66 and an input terminal of first delay circuit 64A. An output terminal of first delay circuit 64A is connected to an inverting input terminal (−) of difference circuit 66. An output terminal of difference circuit 66 is connected to one input terminal of first NAM circuit 61, and an output terminal of pulse generator 65 is connected to another input terminal of first NAM circuit 61. An output terminal of first NAM circuit 61 is connected to an input terminal of second delay circuit 64B and one input terminal of second NAM circuit 62. An output terminal of second delay circuit 64B is connected to another input terminal of second NAM circuit 62. An output terminal of second NAM circuit 62 is connected to an input terminal of low pass filter (LPF) 67.

Figure 11:
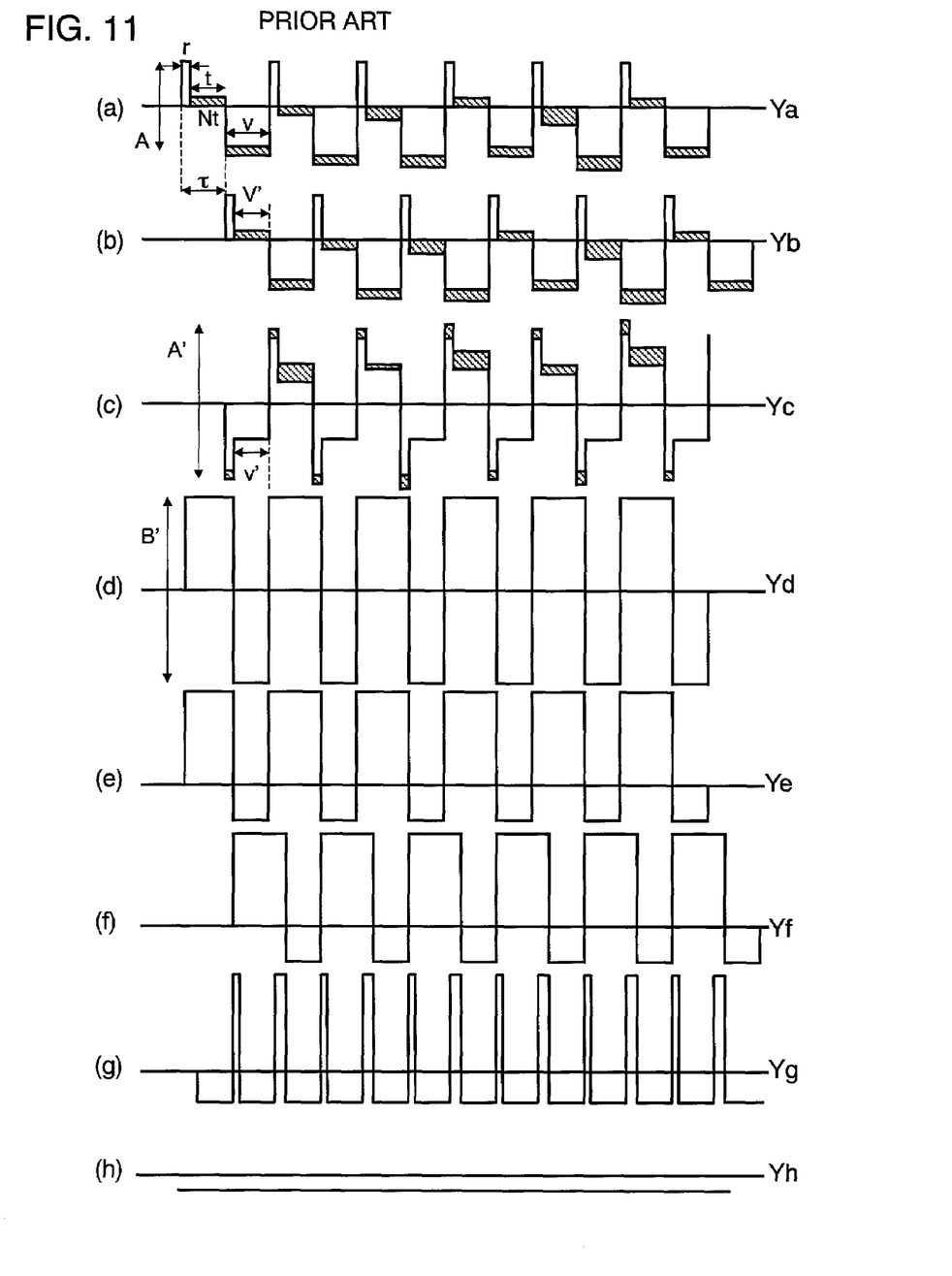
FIG. 11 is a time chart illustrating the operation in the conventional noise reduction circuit employing the NAM circuit.

FIG. 11 is a timing chart illustrating an operation of the noise reduction circuit of FIG. 10, namely, waveforms of signals Ya through Yf in FIG. 10.

FIG. 11(a) illustrates a waveform of CCD output signal Ya of CCD 60. In CCD output signal Ya, reset-level period r, feedthrough-level period t, and signal-level period v appear in this order repeatedly. In CCD output signal Ya, noise Nt in feedthrough-level period t correlates with noise Nv in signal-level period v.

First delay circuit 64A receives CCD output signal Ya, delays signal Ya by specified delay time τ, and outputs delay signal Yb shown in FIG. 11(b) to difference circuit 66. Delay time τ is set so that signal-level period v of CCD output signal Ya overlaps with feedthrough-level period t of delay signal Yb.

CCD output signal Ya is input to the non-inverting input terminal (+) of difference circuit 66, and delay signal Yb of first delay circuit 64A is input to inverting input terminal (−) of difference circuit 66. Difference circuit 66 calculates a difference (Ya−Yb) between the both input signals, and outputs difference signal Yc of the calculation result shown in FIG. 11(c). Difference signal Yc from difference circuit 66 has the same appearance that the difference signal in FIG. 9(c) has. During period v' of a part of signal-level period v of CCD output signal Ya shown in FIG. 11(a), noise Nv in signal-level period v and noise Nt in feedthrough-level period t, which correlate each other, cancel each other and are eliminated.

FIG. 11(d) illustrates a waveform of pulse signal Yd which is output from pulse generator 65 to gate circuit 61. Pulse signal Yd having the same period that CCD output signal Ya has is at a high level during a period except period v'.

Peak-to-peak value B' of pulse signal Yd must be larger than peak-to-peak value A' of difference signal Yc. Since peak-to-peak value A' is twice as large as peak-to-peak value A, peak-to-peak value B' is set to a larger value than what is twice as large as peak-to-peak value A of CCD output signal Ya. Therefore, the high level of pulse signal Yd is higher than a highest one of difference signal Yc, and the low level of pulse signal Yd is lower than a lowest one of difference signal Yc.

With difference signal Yc and pulse signal Yd input, first NAM circuit 61 selects a higher level signal between difference signal Yc and pulse signal Yd during any of reset-level period r, feedthrough-level period t, and signal-level period v of CCD output signal Ya. Therefore, mixed signal Ye, which first NAM circuit 61 outputs, has a waveform shown in FIG. 11(e). A waveform of mixed signal Ye is the same as that of difference signal Yc shown in FIG. 11(c) during a period v', which is a part of signal-level period v of CCD output signal Ya shown in FIG. 11(a). Except during period v', the waveform of signal Ye is replaced with pulse signal Yd shown in FIG. 11(d). Mixed signal Ye, which first NAM circuit 61 outputs, is output to second delay circuit 64B and second NAM circuit 62.

Second delay circuit 64B delays mixed signal Ye by one half period of CCD output signal Ya and outputs signal Yf shown in FIG. 11(f) to second NAM circuit 62. With mixed signal Ye and delay signal Yf input, second NAM circuit 62 selects a higher level signal between mixed signal Ye and delay signal Yf, during any of reset-level period r, feedthrough-level period T, and signal-level period v of CCD output signal Ya. Therefore, mixed signal Yg, which second NAM circuit 62 outputs, has a waveform shown in FIG. 11(g).

A waveform of mixed signal Yg includes a high level part of mixed signal Ye and a high level part of delay signal Yf.

LPF 67 receives mixed signal Yg from second NAM circuit 62, rejects useless high frequencies, makes the signal smoothed, and outputs final output signal Yh shown in FIG. 11(h).

With a number of pixels of CCD increased and with a period during which a signal for one pixel is processed (hereinafter referred to as pixel period) decreased, the noise reduction circuit which employs the delay and differential noise suppression method shown in FIG. 8 needs to a broadband switching circuit used in gate circuit 58. Therefore, the noise reduction circuit hardly gets enough noise reduction effect.

On the other hand, the noise reduction method for which a NAM circuit is used can surely get enough noise reduction even with CCD of more pixel number and with broader-band noise reduction circuit, because the method does not require a switching operation.

Because an increase in the number of pixels of CCD makes any noise reduction circuit described above needs broadband circuits, the power consumption of the circuit is increased. Namely, the increase in the number of pixels of CCD 50 and 60 makes the pixel period decreased, and makes a signal amplitude at reset-level period r shown in FIG. 9(a) and FIG. 11(a) increased. Therefore, peak-to-peak value A of CCD output signal is increased.

As is clear from the cases of FIG. 9(c) and FIG. 11(c), difference circuit 56 and 66, which are used in conventional noise reduction circuits, must have a wider dynamic range than what is twice as large as peak-to-peak value A. Therefore, the power consumption of the difference circuits is increased. Likewise, gate circuit 58 and first and second NAM circuits in later stages of difference circuits 56 and 66 must have a wider dynamic range than what is twice as large as peak-to-peak value A. Therefore, the power consumption of these circuits is increased. Furthermore, since pulse generator 65 shown in FIG. 10 has to generate pulse signal Yd with a large peak-to-peak value, the power consumption of the generator is increased.

SUMMARY OF THE INVENTION

The present invention provides a noise reduction circuit which has low power consumption even for a charge coupled device (CCD) with a high pixel density, namely, a great number of pixels, and has enough noise reduction effect.

The noise reduction circuit of the present invention includes a pulse generator generating plural types of pulse signals which have the same period that an output signal of a charge coupled device (CCD) has and two mixing circuits selecting a lower level signal in the same way as non-additive mixing (NAM) circuit does. A first mixing circuit selects a lower level signal between the output signal of CCD and a first pulse signal generated by the pulse generator. And, a second mixing circuit selects a lower level signal between the output signal of CCD and a second pulse signal generated by the pulse generator. A delay circuit delays the output signal of the second mixing circuit, then, a difference circuit calculates a difference between the output signal of the first mixing circuit and the output signal of the delay circuit.

The configuration described above has effects as follows. A noise in a feedthrough-level period cancels that in a signal-level period. The cancellation makes a noise in the output signal of CCD reduced. Since, before calculating difference, a lower level signal between the output signal from CCD and the first pulse signal is selected and since a lower level signal of the output signal of the CCD and the second pulse signal is selected, a peak-to-peak value of these pulse signals can be lowered. Even if CCD has a larger number of pixels a shorter pixel period, the difference circuit, the mixing circuits, and the delay circuit may have a narrow dynamic range. The power consumption of the pulse generator, the difference circuit, the mixing circuits, and the delay circuit is thus reduced.

Another noise reduction circuit of the present invention includes a delay circuit which makes an output signal from a charge coupled device (CCD) delayed and a pulse generator which outputs a pulse signal which has the same period that the output signal of CCD has. Also, Two mixing circuits which select a lower level signal and output it in the same way as a conventional non-additive mixing (NAM) circuit does. A first mixing circuit selects a lower level signal between an output signal from CCD and a pulse signal from the pulse generator, and a second mixing circuit selects a lower level signal between an delay signal from the delay circuit and the pulse signal from the pulse generator. A difference circuit calculates a difference between an output signal of the first mixing circuit and an output signal of the second mixing circuit.

The configuration described above has following effects. A noise in a signal-level period is canceled by that in a feedthrough-level period cancel, and then, a noise in an output signal of CCD is reduced. Since the lower level signal is selected between the output signal of CCD and the pulse signal and since the lower level signal of the delayed signal of CCD and the pulse signal before the difference is calculated, the peak-to-peak value of the pulse signal can be small. Even if CCD has a large number of pixels and a short pixel period, the difference circuit and the mixing circuits may have a narrow dynamic range. The power consumption of each of the pulse generator, the difference circuit, and the mixers is reduced. Since the pulse generator outputs only one type of pulse signal, the circuit become simple, and the power consumption of the generator is more reduced.

Yet another noise reduction circuit of the present invention includes an inverting circuit which inverts an output signal of a charge coupled device (CCD) and a delay circuit which delays an output signal of the inverting circuit. A pulse generator outputs only one type of pulse signal which has the same period that CCD has. Two mixing circuits select a lower level signal and output it in the same way as a conventional non-additive mixing (NAM) circuit does. A first mixing circuit selects a lower level signal between an output signal of CCD and the pulse signal from the pulse generator, and a second mixing circuit selects a lower level signal between an delay signal from the delay circuit and a pulse signal from the pulse generator. Then, a summing circuit calculates a sum of an output signal of the first mixing circuit and an output signal of the second mixer circuit.

The configuration described above has following effects. A noise in a signal-level period is canceled by that in a feedthrough-level period. The noise in an output signal of CCD is thus reduced. The lower level signal between the output signal of CCD and the pulse signal, and the lower level signal between the delay signal, into which the output signal gets delayed, and the pulse signal are selected respectively, and these selected signals are summed. Even if CCD has a large number of pixels a short pixel period, the summing circuit and the mixing circuits may have a narrow dynamic range. The power consumption of each of the pulse generator, the summing circuit, and the mixing circuits is reduced. Since the pulse generator outputs only one type of pulse signal, the circuit may be simple, and the power consumption of the circuit is more reduced. In particular, since the pulse generator generates the pulse signal of a small peak-to-peak value, even if CCD has a large number of pixels and a short pixel period, the power consumption of the pulse generator is greatly reduced.

DESCRIPTION OF THE PREFERRED EMBODIMENTS

Embodiment 1

A noise reduction circuit in accordance with embodiment 1 of the present invention is described hereinafter with reference to FIG. 1, FIG. 2, and FIG. 7.

Figure 1:
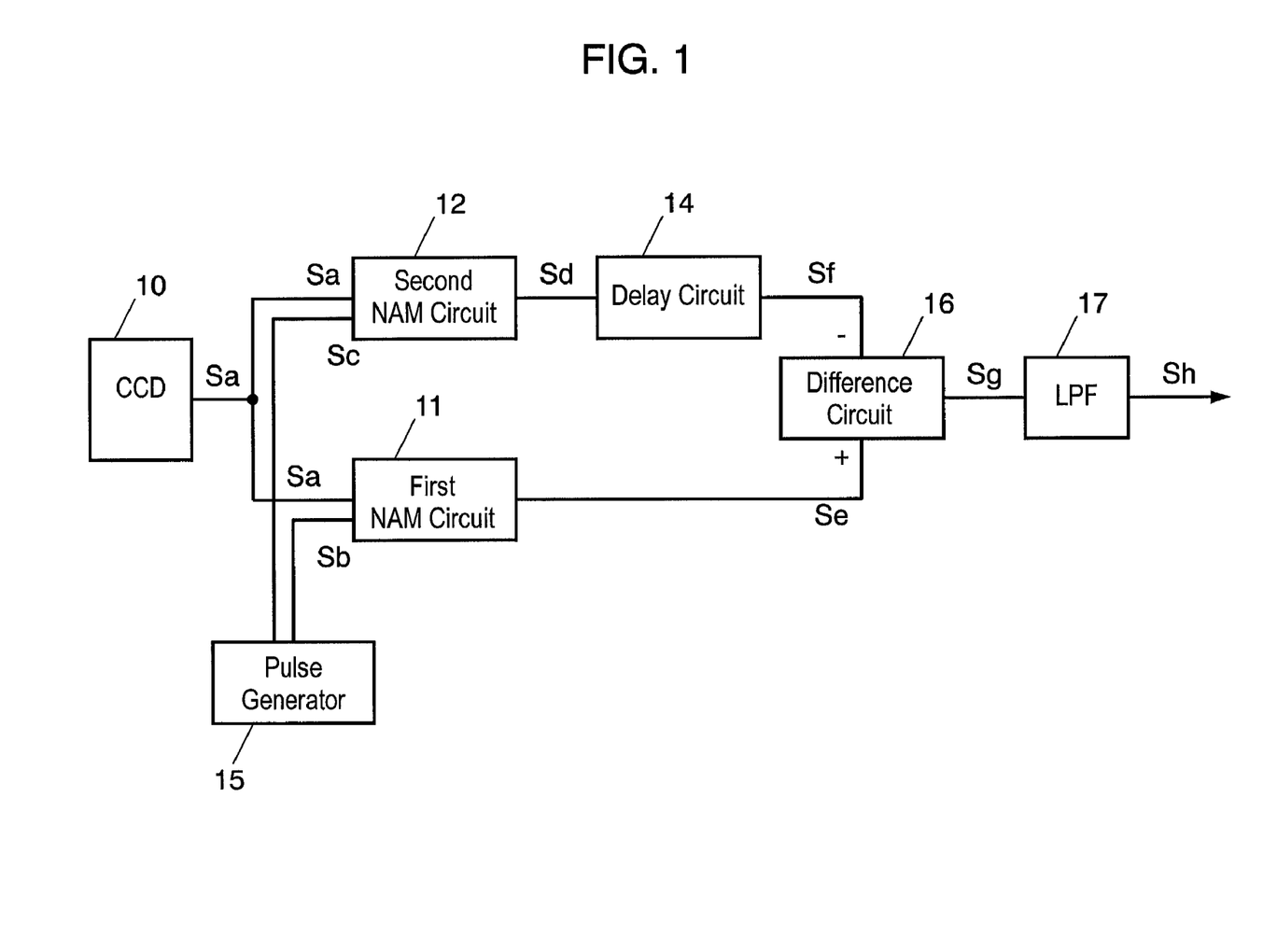
FIG. 1 is a block diagram illustrating a noise reduction circuit in accordance with embodiment 1 of the invention.

FIG. 1 is a block diagram illustrating a noise reduction circuit in accordance with embodiment 1. An output terminal of charge coupled device (CCD) 10 is connected to one input terminal of first non-additive mixing (NAM) circuit 11 and one input terminal of second NAM circuit 12. Output terminals of pulse generator 15 are connected to another input terminal of first NAM circuit 11 and another input terminal of second NAM circuit 12 respectively. Pulse generator 15 outputs two types of pulse signals Sb and Sc which have the same period that output signal Sa of CCD 10 has. A difference between the two types of pulse signals Sb and Sc is described later with reference to FIG. 2.

First pulse signal Sb of these two type signals Sb and Sc is input to first NAM circuit, and second pulse signal Sc is input to second NAM circuit. First NAM circuit 11 selects a lower level signal between output signal Sa of CCD 10 and first pulse signal Sb, and outputs it as output signal Se. Second NAM circuit 12 selects a lower level signal between output signal Sa of CCD 10 and second pulse signal Sb, and outputs it as output signal Sd as well.

How two NAM circuits 11 and 12 select and output the lower level signal is described later with reference to FIG. 7.

An output terminal of second NAM circuit 12 is connected to an input terminal of delay circuit 14, and an output terminal of delay circuit 14 is connected to an inverting input terminal (−) which is one input terminal of difference circuit 16. Namely, mixed signal Sd, which second NAM circuit outputs, is input to delay circuit 14, and delay signal Sf, which delay circuit outputs, is input into the inverting input terminal (−) of difference circuit 16. An output terminal of first NAM circuit 11 is connected to a non-inverting input terminal (+), which is another input terminal of difference circuit 16. Namely, mixed signal Se, which first NAM circuit outputs, is input into the non-inverting input terminal (+) of difference circuit 16.

Difference circuit 16 calculates a difference (Se−Sf) between mixed signal Se, which is input into the non-inverting input terminal (+) from first NAM circuit 11, and delay signal Sf, which is input into the inverting input terminal (−) from delay circuit 14; and outputs difference signal Sg as the calculation result. An output terminal of difference circuit 16 is connected to an input terminal of low pass filter (LPF) 17 which outputs output signal Sh, from which useless higher frequency signals are rejected.

Figure 7:
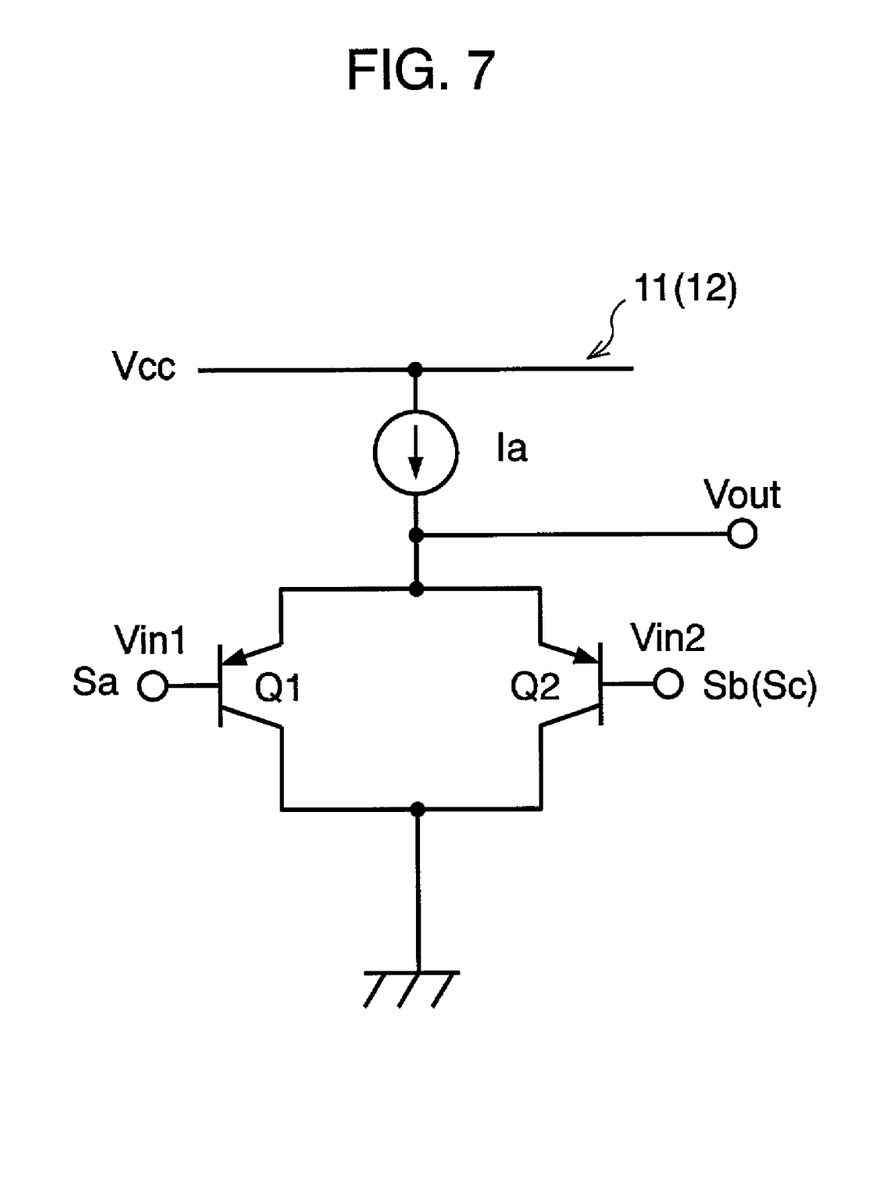
FIG. 7 is a circuit diagram illustrating a concrete circuit of a first non-additive mixing (NAM) circuit and a second NAM circuit in accordance with embodiments 1, 2, and 3 of the present invention.

FIG. 7 is a circuit diagram illustrating a concrete circuit configuration for first NAM circuit 11 and second NAM circuit 12. One terminal of constant-current source Ia is coupled with DC power source Vcc. Emitters of first PNP transistor Q1 and second PNP transistor Q2 are coupled with each other. The node between the two emitters is coupled with another terminal of constant-current source Ia and output terminal Vout. Collectors of transistors Q1 and Q2 are coupled with ground GND. A base of first PNP transistor Q1 is first input terminal Vin1, and a base of second PNP transistor Q2 is second input terminal Vin2.

It is assumed that CCD output signal Sa from CCD 10 is input into first input terminal Vin1, and first pulse signal Sb from pulse generator 15 is input into second input terminal Vin2. When a potential of CCD output signal Sa is lower than that of first pulse signal Sb, first PNP transistor Q1 works as an emitter follower, second PNP transistor Q2 is cut-off. Therefore, the potential of CCD output signal Sa, which is input into first input terminal Vin1, is output from output terminal Vout just as it is. On the other hand, when a potential of first pulse signal Sb is lower than that of CCD output signal Sa, second PNP transistor Q2 works as an emitter follower, first PNP transistor Q1 is cut-off. Therefore, the potential first pulse signal Sb, which is input into second input terminal Vin2, is output from output terminal Vout just as it is.

First NAM circuit 11 having the circuit shown in FIG. 7 has been described above. Second NAM circuit 12, in which second pulse signal Sc from pulse generator 15 input into second input terminal Vin2 of second PNP transistor Q2, works in the same way as first NAM circuit 11 works. Namely, each of first and second NAM circuits 11 and 12 has two signals input respectively and select a lower level signal between the two signals, and output it.

An operation of the noise reduction circuit in accordance with embodiment 1 is described hereinafter with reference to a timing chart shown in FIG. 2.

Figure 2:
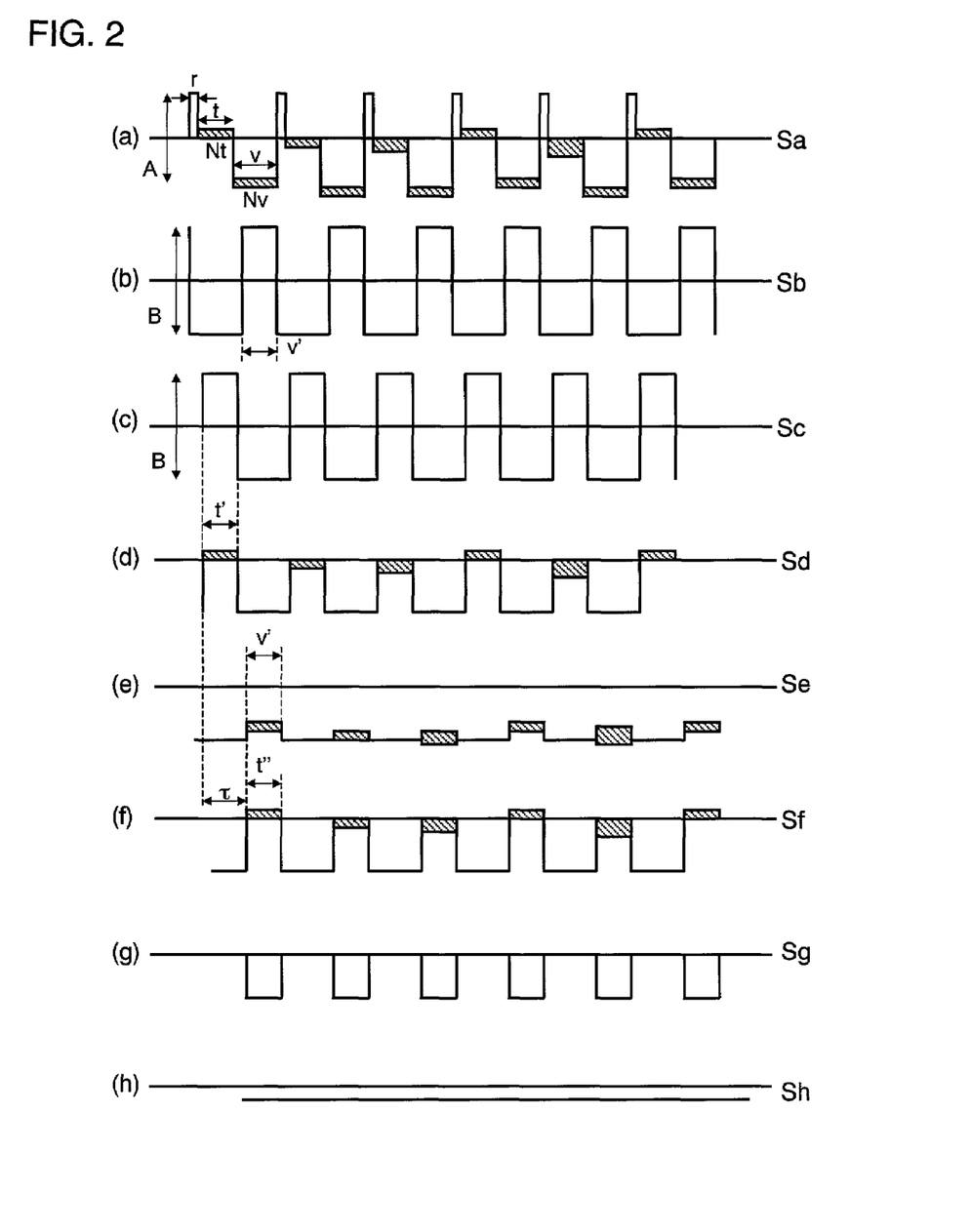
FIG. 2 is a time chart illustrating the operation in the noise reduction circuit in accordance with embodiment 1 of the invention.

FIG. 2(a) illustrates a waveform of CCD output signal Sa from CCD 10. In CCD output signal Sa, reset-level period r, feedthrough-level period t, and signal-level period v appear in this order repeatedly. A noise of CCD output signal Sa has noise Nt, which is shown as a shaded area, in feedthrough-level period t and noise Nv, which is shown as a shaded area, in signal-level period v, where noise Nt and noise Nv correlate each other.

FIG. 2(b) illustrates a waveform of first pulse signal Sb which pulse generator 15 outputs to first NAM circuit 11. Pulse signal Sb having the same period that CCD output signal Sa has is at a high level only during a period v' of a part of signal-level period v of CCD output signal Sa.

FIG. 2(c) illustrates a waveform of second output signal Sc which pulse generator 15 outputs to second NAM circuit 12. Pulse signal Sc having the same period that CCD output signal Sa has is at a high level only during a period t' of a part of feedthrough-level period t of CCD output signal Sa. Peak-to-peak value B of first pulse signal Sb and second pulse signal Sc are set to a larger value than peak-to-peak value A of CCD output signal Sa respectively. Therefore, the high level potentials of first pulse signal Sb and second pulse signal Sc are higher than the highest potential of CCD output signal Sa, and the low level potentials of pulse signals Sb and Sc are lower than the lowest potential of CCD output signal Sa.

First NAM circuit 11 receives CCD output signal Sa and first pulse Signal Sb, and selects and outputs a lower level signal between CCD output signal Sa and first pulse signal Sb in any of reset-level period r, feedthrough-level period t, and signal-level period v. A waveform of mixed signal Se from NAM circuit 11 thus become what is shown in FIG. 2(e). Mixed signal Se is the same as CCD output signal Se during period v', which is a part of signal-level period v of CCD output signal Sa shown in FIG. 2(a). Except during period v', the waveform of signal Se is replaced with that of pulse signal Sb shown in FIG. 2(d). Mixed signal Se from first NAM circuit 11 is output to non-inverting input terminal (+) of difference circuit 16.

Second NAM circuit 12 receives CCD output signal Sa and second pulse Signal Sc, and selects and outputs a lower level signal between CCD output signal Sa and second pulse signal Sc in any of reset-level period r, feedthrough-level period t, and signal-level period v. A waveform of mixed signal Sd from NAM circuit 12 thus become what is shown in FIG. 2(d). Mixed signal Sd is the same as CCD output signal Sa during period t', which is a part of feedthrough-level period t of CCD output signal Sa shown in FIG. 2(a). Except during period t', the waveform of signal Sd is replaced with that of pulse signal Sc shown in FIG. 2(c).

Delay circuit 14 receives mixed signal Sd from second NAM circuit 12, delays signal Sd by specified delay time τ and outputs delay signal Sf to inverting terminal (−) of difference circuit 16. Delay time τ is set so that period t' of mixed signal Sd from second NAM circuit 12 shown in FIG. 2(d) shifts to period v' of mixed signal Se from first NAM circuit 11 shown in FIG. 2(e). Namely, Delay time τ is set so that signal-level period v of CCD output signal Sa overlaps with feedthrough-level period t of delay signal Sf from delay circuit 14. As a result, time T'' of delay signal Sf corresponding to the time shift just coincides with period v' of mixed signal Se from first NAM circuit 11.

Difference circuit 16 receives mixed signal Se from first NAM circuit 11 and delay signal Sf from delay circuit 14 with period v' and period t'' which overlap each other, and calculates a difference (Se−Sf) between the two signals, and outputs output signal Sg as the calculation result shown in FIG. 2(g). Noise Nv in signal-level period v and noise Nt in feedthrough-level period v, which correlate each other, cancel each other and are eliminated in difference signal Sg.

LPF 17 receives output signal Sg from difference circuit 16, rejects useless higher frequencies, makes the signal smoothed, and outputs final output signal Sh shown in FIG. 2(h).

The noise reduction circuit in accordance with embodiment 1 provides advantages as follows. In comparison with the conventional noise reduction circuit employing a delay and differential noise suppression method, the noise reduction circuit in accordance with embodiment 1 does not employ a gate circuit, and does not require a switching operation. Even if CCD 10 has large number of pixels and a short pixel period, the noise reduction circuit can thus easily reduce a noise. Since a dynamic range of difference circuit 16 can be less than a half of peak-to-peak value A of CCD output signal Sa, the power consumption of difference circuit 16 is reduced.

In comparison with the conventional noise reduction circuit employing the NAM circuit, the noise reduction circuit in accordance with embodiment 1 can reduce peak-to-peak values B of pulse signals Sb and Sc output from pulse generator 15. Even if CCD 10 has a large number of pixels and a short pixel period, the power consumption of pulse generator 15 is thus reduced.

Furthermore, the peak-to-peak value of the signals which are input into NAM circuits 11 and 12, is reduced to a half of that in the conventional circuit. Even if CCD 10 has a large number of pixels and a short pixel period, the dynamic ranges in NAM circuits 11 and 12 are decreased, and the power consumption of the circuits is thus reduced.

In addition, the dynamic range of delay circuit 14 can be less than a half of peak-to-peak value A of CCD output signal Sa. Even if CCD 10 has a large number of pixels and a short pixel period, the power consumption of delay circuit 14 is thus reduced.

Embodiment 2

A noise reduction circuit in accordance with embodiment 2 of the present invention is described hereinafter with reference to FIG. 3, FIG. 4, and FIG. 7.

Figure 3:
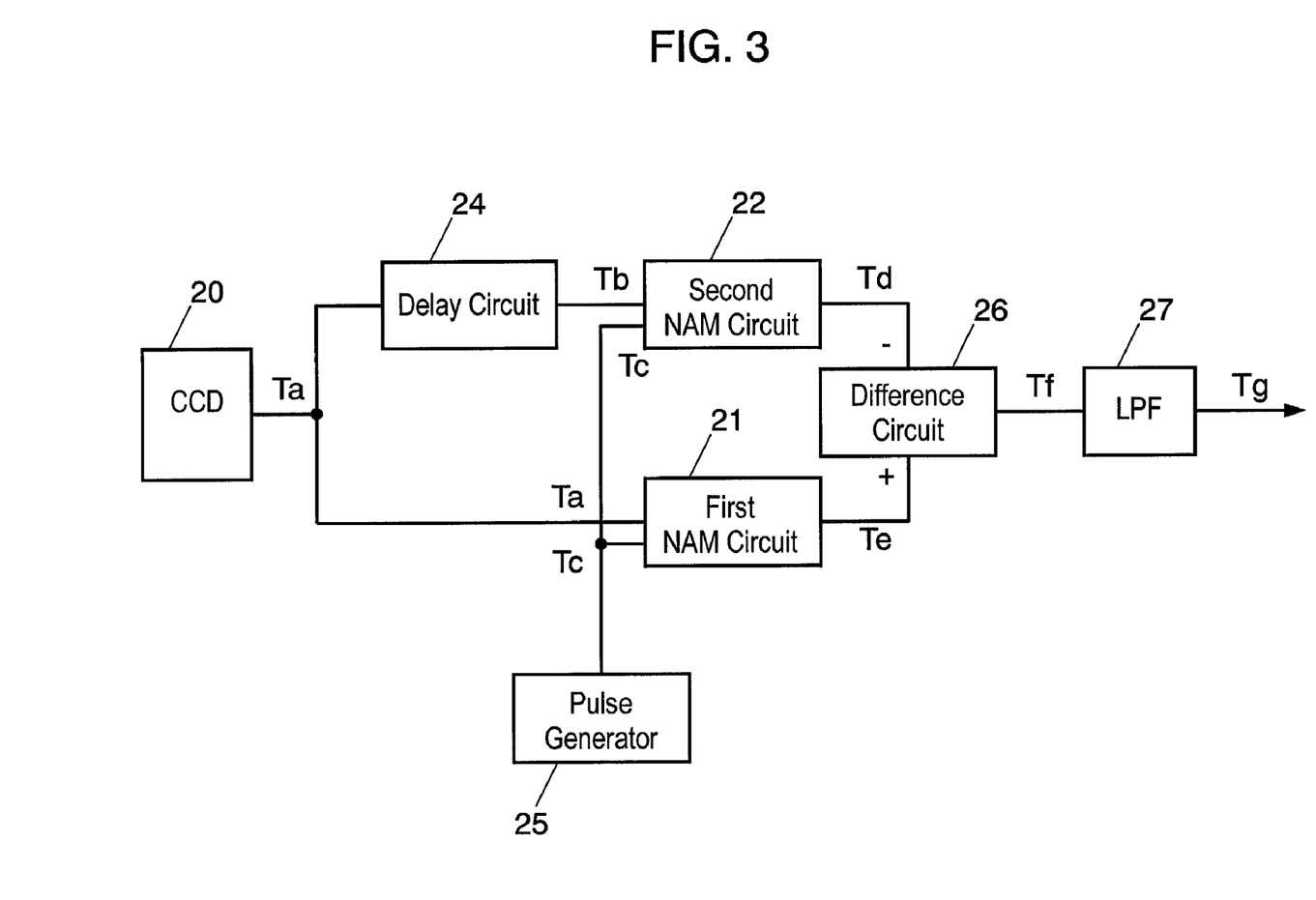
FIG. 3 is a block diagram illustrating a noise reduction circuit in accordance with embodiment 2 of the invention.

First, FIG. 3 is a block diagram illustrating a noise reduction circuit in accordance with embodiment 2. An output terminal of CCD 20 is connected to one input terminal of first NAM circuit 21 and an input terminal of delay circuit 24. An output terminal of delay circuit 24 is connected to one input terminal of second NAM circuit 22. Delay circuit 24 receives CCD output signal Ta of CCD 20, delays signal Ta, and outputs output delay signal Tb to second NAM circuit 22. An output terminal of pulse generator 25 is connected to another input terminal of first NAM circuit 21 and another input terminal of second NAM circuit 22. Pulse generator 25 outputs one type of pulse signal Tc which has the same period that an output signal Ta of CCD 20 has.

First NAM circuit 21 selects and outputs a lower level signal between CCD output signal Ta and pulse signal Tc as output signal Te. Second NAM circuit 22 selects and outputs a lower level signal between CCD output signal Tb and pulse signal Tc as output signal Td as well.

Circuit configurations for both NAM circuits 21 and 22, which output lower level signals, is illustrating in FIG. 7 as well as embodiment 1.

An output signal of second NAM circuit 22 is connected to an inverting input terminal (−), which is one input terminal of difference circuit 26. Namely, mixed signal Td of second NAM circuit 22 is input to the inverting input terminal (−) of difference circuit 26. An output signal of first NAM circuit 21 is connected to a non-inverting input terminal (+), which is another input terminal of difference circuit 26. Namely, mixed signal Td from first NAM circuit 21 is input to the non-inverting input terminal (+) of difference circuit 26.

Difference circuit 26 calculates a difference (Te−Td) between mixed signals Te and Td and outputs difference signal Tf as the calculation result. An output terminal of differencd circuit 26 is connected to an input terminal of low pass filter (LPF) 27. LPF 27 rejects useless higher frequencies, and outputs output signal Tg.

Second, an operation of the noise reduction circuit in accordance with embodiment 2 is described hereinafter with reference to a timing chart shown in FIG. 4.

Figure 4:
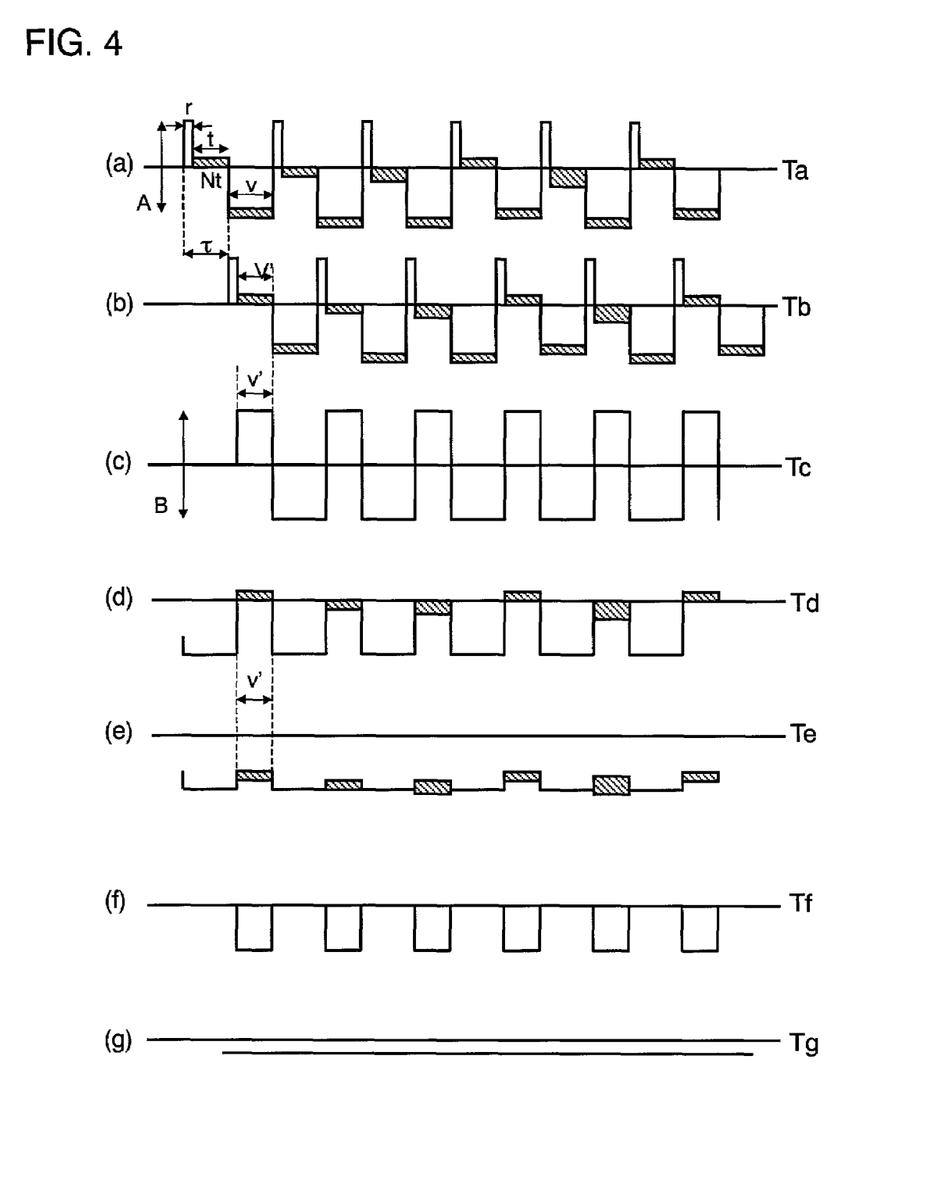
FIG. 4 is a time chart illustrating the operation in the noise reduction circuit in accordance with embodiment 2 of the invention.

FIG. 4(a) illustrates a waveform of CCD output signal Ta from CCD 20. In CCD output signal Ta, reset-level period r, feedthrough-level period t, and signal-level period v appear in this order repeatedly. In a noise of CCD output signal Ta, noise Nt in feedthrough-level period t and noise Nv in signal-level period v correlate each other.

Delay circuit 24 delays CCD output signal Ta by specified delay time τ outputs signal Tb to second NAM circuit 22. Delay time τ is set so that signal-level period v of CCD output signal Ta overlaps with feedthrough-level period t in delay signal Tb.

FIG. 4(c) illustrates a waveform of pulse signal Tc, which pulse generator 25 outputs to first and second NAM circuits 21 and 22. Pulse signal Tb having the same period that CCD output signal Ta has is generated so as to be at a high level only during period v' of a part of signal-level period v of CCD output signal Ta.

Peak-to-peak value B of pulse signal Tc is set to a larger value than peak-to-peak value A of CCD output signal Ta. Therefore, the high level potential of pulse signal Tc is higher than that of CCD output signal Ta, and the lowest level potential of pulse signal Tc is lower than that of CCD output signal Ta.

First NAM circuit 21 receives CCD output signal Ta and pulse Signal Tc, and selects and outputs a lower level signal between CCD output signal Ta and pulse signal Tc in any of reset-level period r, feedthrough-level period t, and signal-level period v of CCD output signal Ta. Therefore, a waveform of mixed signal Te from NAM circuit 21 become that is shown in FIG. 4(e). Mixed signal Te from first NAM circuit 21 is the same as CCD output signal Ta during period v', which is a part of signal-level period v of CCD output signal Ta shown in FIG. 4(a). Except during period v', a waveform of signal Te is replaced with that of pulse signal Tc shown in FIG. 4(c). Mixed signal Te from first NAM circuit 21 is output to non-inverting input terminal (+) of difference circuit 26.

Second NAM circuit 22 receives delay signal Tb and pulse signal Tc, and selects and outputs a lower level signal between delay signal Tb and pulse signal Tc in any of reset-level period r, feedthrough-level period t, and signal-level period v of CCD output signal Ta. Therefore, mixed signal Td, which second NAM circuit 62 outputs, has a waveform shown in FIG. 4(d). A waveform of mixed signal Td from second NAM circuit 22 is the same as that of delay signal Tb during period v'. Except during period v', the waveform of delay signal Td is replaced with that of pulse signal Tc shown in FIG. 4(c).

Delay time τ of delay circuit 24 is set that period v' of delay signal Tb shown in FIG. 4(b) or period v' of mixed signal Td from second NAM 22 circuit shown in FIG. 4(d) overlaps with period v' of mixed signal Te shown in FIG. 4(e). As a result, period v' of mixer signal Td from second NAM circuit 22 shown in FIG. 4(d) just coincides with period v' of mixed signal Te from first NAM circuit shown in FIG. 4(e).

Difference circuit 26 receives mixed signal Te from first NAM circuit 21 and mixed signal Td from second NAM circuit 22 with period v' in FIG. 4(d) and period v' in FIG. 4(e) overlapped, calculates a difference (Te−Td) between the two signals, and outputs output signal Tf as the calculation result shown in FIG. 4(f). Noise Nv during signal-level period v and noise Nt during feedthrough-level period t, which correlate each other, cancel each other and are eliminated in difference signal Tf.

LPF 27 receives difference signal Tf from difference circuit 26, rejects useless higher frequency signals, makes the signal smoothed, and outputs final output signal Tg shown in FIG. 4(g).

As a result, the noise reduction circuit in accordance with embodiment 2 provides advantages as follows.

In comparison with the conventional noise reduction circuit employing a delay and differential noise suppression method, the noise reduction circuit in accordance with embodiment 2 does not employ a gate circuit, and does not require a switching operation. Even if CCD 20 has a large number of pixels and a short pixel period, the noise reduction circuit can thus easily reduce a noise. Since a dynamic range of difference circuit 26 is less than a half of peak-to-peak value A of CCD output signal Ta, the power consumption of difference circuit 26 is thus reduced.

In comparison with the conventional noise reduction circuit employing the NAM circuit, the noise reduction circuit in accordance with embodiment 2 can reduce peak-to-peak value B of pulse signal Tc from pulse generator 25. Even if CCD 20 has a large number of pixels and a short pixel period, the power consumption of pulse generator 25 is thus reduced.

Furthermore, the peak-to-peak values of the signals, which are input into NAM circuits 21 and 22, is reduced to a half of the value in the conventional circuit. Even if CCD 20 has a large number of pixels and a short pixel period, the dynamic ranges of NAM circuits 21 and 22 are narrow, and the power consumption of the circuits is thus reduced.

In addition, in comparison with embodiment 1, as pulse generator 25 must outputs one type of pulse signal Tc in the noise reduction circuit in accordance with embodiment 2, the circuit is simple, and the power consumption of the circuit is reduced.

Embodiment 3

A noise reduction circuit in accordance with embodiment 3 of the present invention is described hereinafter with reference to FIG. 5, FIG. 6, and FIG. 7.

Figure 5:
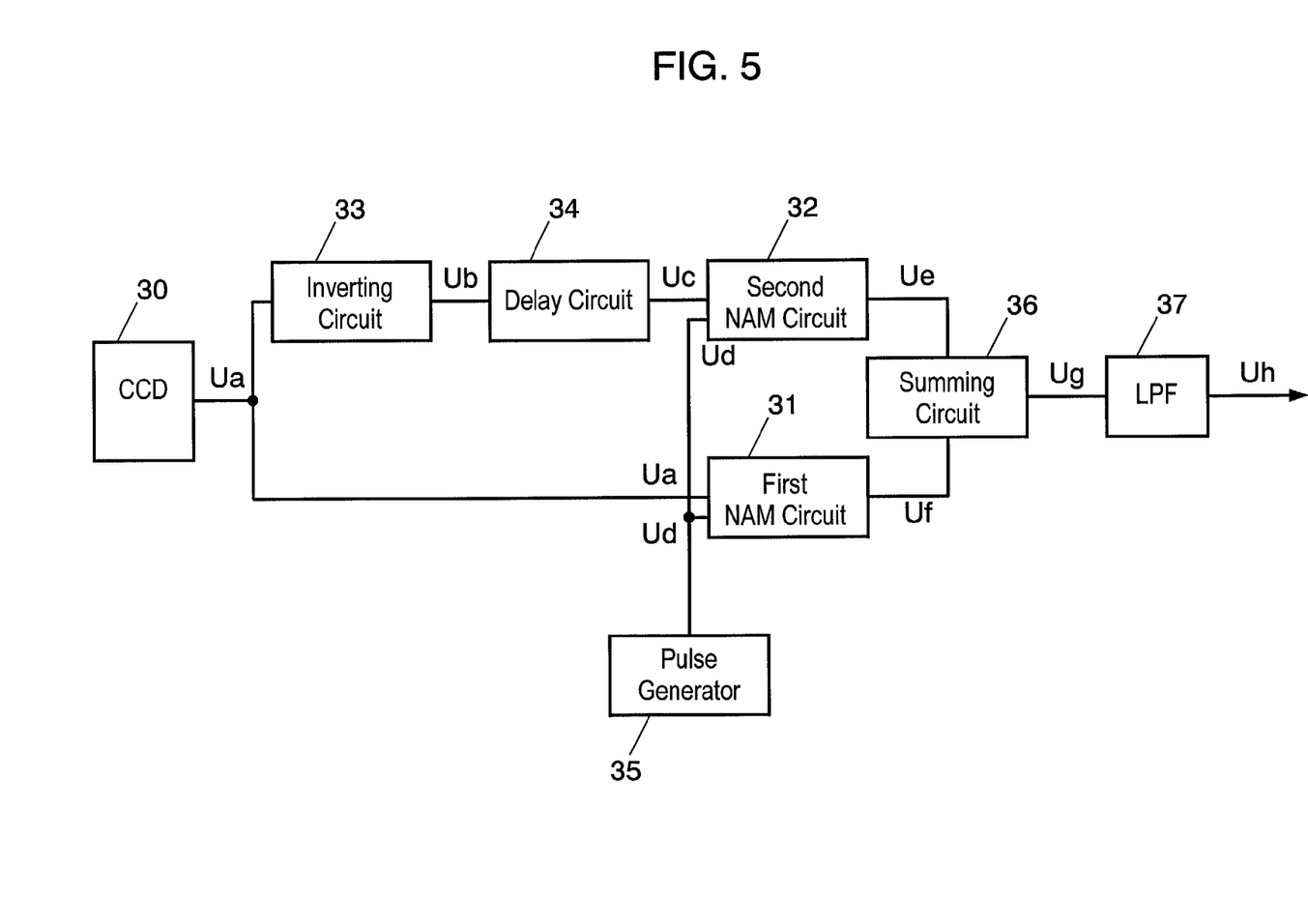
FIG. 5 is a block diagram illustrating a noise reduction circuit in accordance with embodiment 3 of the invention.

FIG. 5 is a block diagram illustrating a noise reduction circuit in accordance with embodiment 3. An output terminal of CCD 30 is connected to one input terminal of first NAM circuit 31 and an input terminal of inverting circuit 33. An output terminal of inverting circuit 33 is connected to an input terminal of delay circuit 34, and an output terminal of delay circuit 34 is connected to one input terminal of second NAM circuit 32. Inverting circuit 33 inverts output signal Ua of CCD 30, and outputs inverted signal Ub. Delay circuit 34 receives inverted signal Ub from inverting circuit 33, delays signal Ub, and outputs signal Uc to second NAM circuit 32. An output terminal of pulse generator 35 is connected to another input terminal of first NAM circuit 31 and another input terminal of second NAM circuit 32. Pulse generator 35 outputs one type of pulse signal Ud which has the same period as that of an output signal Ua of CCD 30.

First NAM circuit 31 selects and outputs a lower level signal between CCD output signal Ua and pulse signal Ud as output signal Uf. Second NAM circuit 32 selects and outputs a lower level signal between delay signal Uc and pulse signal Ud as output signal Ue.

A circuit configuration for both NAM circuits 31 and 32, each of which outputs a lower level signal, is illustrated in FIG. 7 as well as embodiment 1 of the present invention.

An output terminal of second NAM circuit 32 is connected to one input terminal of summing circuit 36. Namely, mixed signal Ue from second NAM circuit 32 is input to summing circuit 36. An output signal of first NAM circuit 31 is connected to another input terminal of summing circuit 36. Namely, mixed signal Uf from first NAM circuit 31 is input to summing circuit 36.

Summing circuit 36 calculates a sum (Uf+Ue) of mixed signal Uf from first NAM circuit 31 and delay signal Ue from second NAM circuit 32, and outputs difference signal Ug as the calculation result. An output terminal of summing circuit 36 is connected to an input terminal of low pass filter (LPF) 37. LPF 37 rejects useless higher frequency signals, and outputs output signal Uh.

An operation of the noise reduction circuit in accordance with embodiment 3 is described hereinafter with reference to a timing chart shown in FIG. 6.

Figure 6:
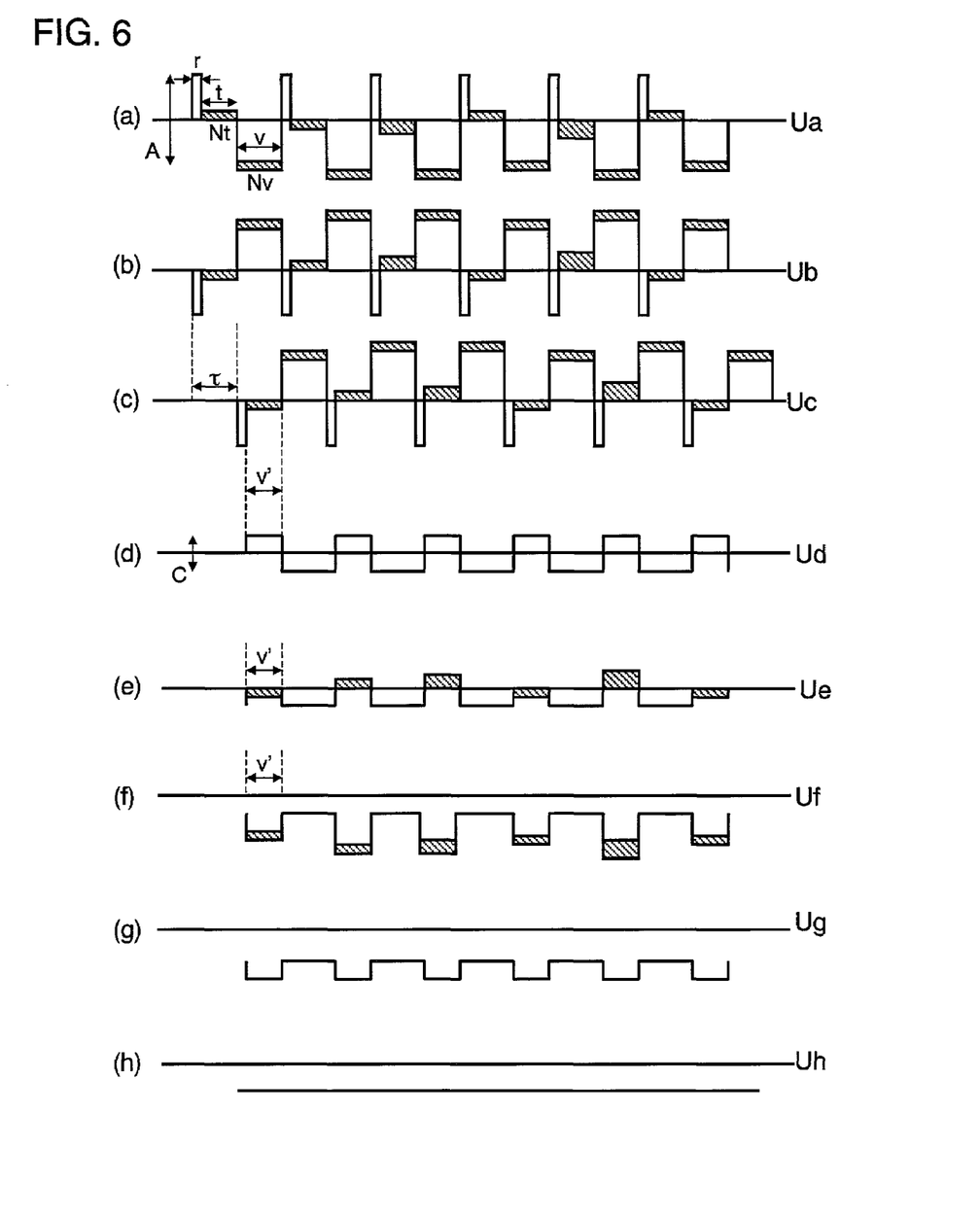
FIG. 6 is a time chart illustrating the operation in the noise reduction circuit in accordance with embodiment 3 of the invention.

FIG. 6(*a*) illustrates a waveform of CCD output signal Ua of CCD 30. In CCD output signal Ua, reset-level period r, feedthrough-level period t, and signal-level period v in this order repeatedly. In a noise of CCD output signal Ua, noise Nt in feedthrough-level period t and noise Nv in signal-level period v correlate each other.

Inverting circuit 33 inverts CCD output signal of CCD 30, outputs inverted signal Ub to delay circuit 34. Delay circuit 34 delays inverted signal Ub from inverting circuit 33 by specified delay time τ, and outputs delay signal Uc shown in FIG. 6(*c*) to second NAM circuit 32. Delay time τ is set so that signal-level period v of CCD output signal Ua overlaps with feedthrough-level period t of delay signal Uc.

FIG. 6(*d*) illustrates a waveform of pulse signal Ud, which pulse generator 35 outputs to first and second NAM circuits 31 and 32. Pulse signal Ud having the same period that CCD output signal Ua has is generated to be at a high level only during period v' of a part of signal-level period v of CCD output signal Ua.

Peak-to-peak value C of pulse signal Ud is set to a significantly smaller value than peak-to-peak value A of CCD output signal Ua. Namely, peak-to-peak value C of pulse signal Ud is set to a larger value than at least what is twice as large as largest noise D included in CCD output signal Ua. (C>2D)

First NAM circuit 31 selects and outputs a lower level signal between CCD output signal Ua and pulse signal Ud during any of reset-level period r, feedthrough-level period t, and signal-level period v. Therefore, the waveform of mixed signal Uf, which first NAM circuit 31 outputs become what is shown in FIG. 4(*f*). A waveform of mixed signal Uf from first NAM circuit 31 is the same as that of CCD output signal Ua during period v', which is a part of signal-level period v of CCD output signal Ua shown in FIG. 4(*a*). Except during period v', the waveform of signal Uf is replaced with that of pulse signal Ud shown in FIG. 4(*d*). Mixed signal Uf from first NAM circuit 31 is output to an input terminal of summing circuit 36.

With delay signal Uc and pulse signal Ud input, second NAM circuit 32 selects and outputs a lower level signal between delay signal Uc and pulse signal Ud during any of reset-level period r, feedthrough-level period t, and signal-level period v. Therefore, a waveform of mixed signal Ue, which second NAM circuit 32 outputs, become what is shown in FIG. 4(*e*). A waveform of mixed signal Ue is the same as that of delay signal Uc during period v' shown in FIG. 4(*c*). Except during period v', the waveform of signal Ue is replaced with that of pulse signal Ud shown in FIG. 4(*d*).

Delay time τ of delay circuit 34 is set so that period v' of delay signal Uc shown in FIG. 6(*c*) namely, period v' of mixed signal Ue from second NAM circuit 32 shown in FIG. 6(*e*) with period v' of mixed signal Uf from first NAM circuit shown in FIG. 6(*f*). As a result, period v' of mixed signal Ue from second NAM circuit 32 shown in FIG. 6(*e*) just coincides with period v' of mixed signal Uf from first NAM circuit.

Summing circuit 36 receives mixed signal Uf from first NAM circuit 31 and mixed signal Ue from second NAM circuit 32 with period v' in FIG. 6(*f*) and period v' in FIG. 6(*e*) overlapped, calculates a sum (Uf+Ue) of the two signals, and outputs summing signal Tf as the calculation result shown in FIG. 6(g). In summing signal Ug, noise Nv during signal-level period v and noise Nt during feedthrough-level period t, which correlate each other, cancel each other, and are eliminated.

LPF 37 receives summing signal Ug, rejects useless higher frequency signals, makes the signal smoothed, and outputs final output signal Uh shown in FIG. 6(h).

As a result, the noise reduction circuit in accordance with embodiment 3 provides advantages as follows.

In comparison with the conventional noise reduction circuit employing a delay and differential noise suppression method, the noise reduction circuit in accordance with embodiment 3 does not employ a gate circuit or a switching operation. Even if CCD 30 has a large number of pixels and a short pixel period, the noise reduction circuit can thus easily reduce a noise. Since a dynamic range of summing circuit 36 can be less than a half of peak-to-peak value A of CCD output signal Ua, the power consumption of summing circuit 36 is reduced.

The peak-to-peak value of the signals which are input into NAM circuits 31 and 32 is reduced to a half of the values in the conventional circuit. Even if CCD 30 has the large number of pixels and a short pixel period, NAM circuits 31 and 32 thus operate with a narrow dynamic range, and the power consumption of the circuits is reduced.

In addition, in comparison with embodiment 1, pulse generator 35 generates only one type of pulse signal Tc with embodiment 3, the circuit become simple, and the power consumption of the circuit is reduced.

Peak-to-peak value C of pulse signal Ud, which pulse generator 35 outputs, can be decreased sufficiently. Even if CCD 30 has a large number of pixels and a short pixel period, the power consumption of the pulse generator is greatly reduced.

What is claimed is:

1. A noise reduction circuit comprising:
   a pulse generator generating a pulse signal which have a same period that an output signal of a charge coupled device (CCD) has;
   a first mixer selecting a lower level signal between the output signal of the CCD and a first pulse signal generated by said pulse generator;
   a second mixer selecting a lower level signal between the output signal of the CCD and a second pulse signal generated by said pulse generator;
   a delay circuit delaying an output signal of said second mixer; and
   a difference circuit outputting a difference between an output signal of said first mixer and an output signal of said delay circuit.

2. The noise reduction circuit of claim 1,
   wherein at least a part of a period during which the first pulse signal is at a high level overlaps with a signal-level period of the output signal of the CCD, and
   wherein a period during which the second pulse signal is at a high level overlaps with a feedthrough-level period of the output signal of the CCD.

3. The noise reduction circuit of claim 1, wherein a delay time at said delay circuit is set so that a feedthrough-level period of an output signal of said delay circuit overlaps with a signal-level period of the output signal of the CCD.

4. The noise reduction circuit of claim 1, wherein a reset-level period, a feedthrough-level period, and a signal-level period appear in this order repeatedly in the output signal of the CCD.

5. A noise reduction circuit comprising:
   a delay circuit delaying an output signal of a charge coupled device (CCD);
   a pulse generator generating a pulse signal which has a same period that the output signal of the CCD has;
   a first mixer selecting a lower level signal between the output signal of the CCD and a pulse signal generated by said pulse generator;
   a second mixer which selects a lower level signal between an output signal of said delay circuit and a pulse signal generated by said pulse generator; and
   a difference circuit outputting a difference between an output signal of said first mixer and an output signal of said second mixer.

6. The noise reduction circuit of claim 5, wherein at least a part of a period during which a pulse signal generated by said pulse generator is at a high level overlaps with a signal-level period of the output signal of the CCD.

7. The noise reduction circuit of claim 5, wherein a delay time at said delay circuit is set so that a feedthrough-level period of an output signal of said delay circuit overlaps with a signal-level period of an output signal of the CCD.

8. The noise reduction circuit of claim 5, wherein a reset-level period, a feedthrough-level period, and a signal-level period appear in this order repeatedly in the output signal of the CCD.

9. A noise reduction circuit of the present invention comprises:
   an inverting circuit inverting an output signal of a charge coupled device (CCD);
   a delay circuit delaying an output signal of said inverting circuit;
   a pulse generator generating a pulse signal which has a same period that the output signal of the CCD has;
   a first mixer selecting a lower level signal between the output signal of the CCD and a pulse signal generated by said pulse generator;
   a second mixer selecting a lower level signal between an output signal of said delay circuit and a pulse signal generated by said pulse generator; and
   a summing circuit outputting a sum of an output signal of said first mixer and an output signal of said second mixer.

10. The noise reduction circuit of claim 9, wherein at least a part of a period during which a pulse signal generated by said pulse generator is at a high level overlaps with a signal-level period of the output signal of the CCD.

11. The noise reduction circuit of claim 9, wherein a delay, time at said delay circuit is set so that a feedthrough-level period of an output signal of said delay circuit overlaps with a signal-level period of the output signal of the CCD.

12. The noise reduction circuit of claim 9, wherein a reset-level period, a feedthrough-level period, and a signal-level period appear in this order repeatedly in the output signal of the CCD.

* * * * *